(12) United States Patent
Knoke et al.

(10) Patent No.: US 11,300,146 B2
(45) Date of Patent: Apr. 12, 2022

(54) SECURING ARRANGEMENT FOR SECURING AT LEAST ONE COMPONENT TO AN APPLIANCE

(71) Applicant: WABCO GMBH, Hannover (DE)

(72) Inventors: Stefan Knoke, Hannover (DE); Tobias Wustrack, Barsinghausen (DE)

(73) Assignee: ZF CV Systems Hannover GmbH, Hannover (DE)

( * ) Notice: Subject to any disclaimer, the term of this patent is extended or adjusted under 35 U.S.C. 154(b) by 464 days.

(21) Appl. No.: 16/492,791

(22) PCT Filed: Feb. 21, 2018

(86) PCT No.: PCT/EP2018/054208
§ 371 (c)(1),
(2) Date: Sep. 10, 2019

(87) PCT Pub. No.: WO2018/162230
PCT Pub. Date: Sep. 13, 2018

(65) Prior Publication Data
US 2020/0056642 A1 Feb. 20, 2020
US 2020/0400172 A9 Dec. 24, 2020

(30) Foreign Application Priority Data
Mar. 10, 2017 (DE) .......................... 102017002357.3

(51) Int. Cl.
*F16B 5/02* (2006.01)
*F16B 17/00* (2006.01)
*F16H 61/00* (2006.01)

(52) U.S. Cl.
CPC ............ *F16B 5/025* (2013.01); *F16B 17/008* (2013.01); *F16H 61/0009* (2013.01)

(58) Field of Classification Search
CPC ......... H01L 2924/0002; H01L 23/4006; H01L 23/4093; H05K 7/12
See application file for complete search history.

(56) References Cited

U.S. PATENT DOCUMENTS

| | | | |
|---|---|---|---|
| 4,429,292 A | 1/1984 | Schedele | |
| 5,504,652 A * | 4/1996 | Foster | H01L 23/4006 |
| | | | 257/E23.084 |

(Continued)

FOREIGN PATENT DOCUMENTS

| | | |
|---|---|---|
| DE | 1841487 U | 11/1961 |
| DE | 3120117 A1 | 12/1982 |
| DE | 10128759 C1 | 4/2003 |

OTHER PUBLICATIONS

English translation of International Search Report for PCT/EP2018/054208 dated Jun. 8, 2018, 2 pages.

(Continued)

*Primary Examiner* — Daniel J Wiley
(74) *Attorney, Agent, or Firm* — Warner Norcross + Judd LLP

(57) ABSTRACT

A securing arrangement for securing at least one component to an appliance is provided. The at least one component is arranged on a receiving region of the appliance. The securing arrangement comprises a securing element configured for locking connection of the at least one component to the appliance. The securing element comprises a plate and has weakened regions and deformation zones between at least one peripheral, unweakened receiving region and at least one pressure and centering region resting on a surface of the component. The securing arrangement further comprises a plurality of spacers extending from the receiving region of the appliance to below the height of the surface of the at least (Continued)

one component. The at least one unweakened receiving region of the securing element is configured to be braced against the spacers.

10 Claims, 3 Drawing Sheets

(56) References Cited

U.S. PATENT DOCUMENTS

| | | | |
|---|---|---|---|
| 5,730,210 A | 3/1998 | Kou | |
| 6,307,748 B1* | 10/2001 | Lin | H01L 23/4093 24/453 |
| 7,310,229 B2* | 12/2007 | Lee | H01L 23/4093 361/709 |
| 7,344,345 B2* | 3/2008 | Aukzemas | F16B 5/0241 411/969 |
| 7,460,372 B2* | 12/2008 | Liao | H01L 23/4006 257/E23.084 |
| 9,414,481 B1* | 8/2016 | Tu | H01L 23/4006 |
| 2004/0132331 A1* | 7/2004 | Osborn | H01L 23/552 257/E23.114 |
| 2006/0007658 A1* | 1/2006 | Chuang | H01L 23/4093 257/E23.086 |
| 2006/0034058 A1* | 2/2006 | Wang | H01L 23/4093 257/E23.103 |
| 2007/0211437 A1 | 9/2007 | Liao et al. | |
| 2008/0128899 A1* | 6/2008 | Mlotkowski | H01L 23/4006 257/E23.101 |
| 2008/0198555 A1* | 8/2008 | Yamashita | H01L 23/4006 361/712 |
| 2008/0219754 A1* | 9/2008 | Lee | H01L 23/4006 403/42 |
| 2010/0053906 A1* | 3/2010 | Liu | H01L 23/4006 361/720 |
| 2015/0262907 A1* | 9/2015 | Degner | F28D 15/0275 165/104.26 |
| 2016/0073549 A1 | 3/2016 | Liu et al. | |
| 2016/0327996 A1* | 11/2016 | Sasabe | H05K 7/20 |
| 2017/0069559 A1* | 3/2017 | Yamamoto | H01L 27/115 |
| 2017/0112012 A1* | 4/2017 | Powers | G01M 99/00 |

OTHER PUBLICATIONS

Machine assisted English translation of DE1841487U obtained from https://worldwide.espacenet.com on Sep. 10, 2019, 5 pages.
Machine assisted English translation of DE10128759C1 obtained from https://patents.google.com on Sep. 10, 2019, 5 pages.

* cited by examiner

SECURING ARRANGEMENT FOR SECURING AT LEAST ONE COMPONENT TO AN APPLIANCE

CROSS-REFERENCE TO RELATED APPLICATIONS

This application is a national phase entry of PCT/EP2018/054208, filed Feb. 21, 2018, which claims priority to German Patent Application No. 10 2017 002 357.3, filed Mar. 10, 2017, both of which are incorporated herein by reference in their entirety.

FIELD OF THE DISCLOSURE

The disclosure relates to a securing arrangement for at least one component to an appliance, comprising a securing element which is deformable in regions and is designed for the substantially play-free and positive-locking and/or non-positive locking connection of the at least one component to the appliance.

BACKGROUND

Laid-Open Application DE 31 20 117 A1 describes a magnet system for a relay, comprising an angular yoke whose yoke legs which are arranged parallel to the coil axis are secured by being able to be plugged on both sides into longitudinal grooves in a main body, wherein a holding plate of elastic metal is arranged on the side of the yoke leg that faces the coil, the holding plate being supported by its central part on the yoke leg and being braced by bent-up side parts on both sides in longitudinal grooves in the main body. On both side parts, the holding plate has runners which are bent up in the plugging-in direction of the yoke leg and are intended to facilitate the plugging in of yoke and holding plate. It is considered expedient if at least one side part of the holding plate has a corner which is bent up counter to the plugging-in direction of the yoke and can be latched into a recess of the main body. This provides a positive-locking holding of the holding plate counter to the plugging-in direction of the yoke.

DE 101 28 759 C1 discloses a method and a device for the mutual fixing of clamping plates for inductive components, for example for fixing the magnetic core of a transformer, of a transducer, of a choke, of a filter or of another inductive component via clamping plates provided for this purpose, for which use is made of a mechanical joining technique, namely clinching or punch riveting. Non-releasable fixing of the clamping plates on one another or in relation to other supporting bodies is thereby achieved. This type of fixing takes place without additional clamping elements and without a complicated structural configuration on the clamping plates.

DE 1 841 487 U1 discloses an arrangement for securing an insulating body, which serves as a mount for the contact springs of a relay, on a plate-like component, for example a yoke part of the magnetic circuit, of the relay, in which a web of rectangular cross section which projects from the surface of the insulation body resting on the plate-like component and protrudes with little play through a corresponding opening in the plate-like component has grooves in the vicinity of its free end on at least two opposite flanks, in which the lobes of a tension spring supported on the plate-like component engage resiliently in such a manner that the supporting surface of the insulating body is thereby pressed against the plate-like component.

Against this background, the disclosure is based on the object of presenting a non-positive locking and positive-locking securing arrangement which can be used, for example, for securing at least one solenoid control valve to a transmission actuator of an automated manual transmission, and which can be constructed in a simple manner and can be mounted in a simple manner.

BRIEF SUMMARY

A securing arrangement for securing at least one component to an appliance is provided. The at least one component is arranged on a receiving region of the appliance. The securing arrangement comprises a securing element configured for locking connection of the at least one component to the appliance. The securing element comprises a plate and having weakened regions and deformation zones between at least one peripheral, unweakened receiving region and at least one pressure and centering region resting on a surface of the component. The securing arrangement further comprises a plurality of spacers extending from the receiving region of the appliance to below the height of the surface of the at least one component. The at least one unweakened receiving region of the securing element is configured to be braced against the spacers.

Another securing arrangement for securing at least one component to an appliance is provided. The securing arrangement comprises a securing element which is deformable in regions and is configured for substantially play-free and at least one of a positive-locking or a non-positive locking connection of the at least one component to the appliance. The securing element comprises a plate. The securing element has weakened regions and deformation zones between at least one peripheral, unweakened receiving region and at least one pressure and centering region resting on a surface of the component. The at least one component is arranged on a receiving region of the appliance. A plurality of spacers extend from the receiving region of the appliance to below the height of the surface of the at least one component. The at least one unweakened receiving region of the securing element is configured as a plate and is configured to be braced against the spacers by utilizing screws such that the deformation zones are deformed and the pressure and centering region resting on the surface of the at least one component fixes the component to the appliance in at least one of a positive-locking and/or or a non-positive locking connection.

BRIEF DESCRIPTION OF THE DRAWING

The disclosure is described in greater detail below with reference to the accompanying figures, in which.

DETAILED DESCRIPTION

Figure 1:
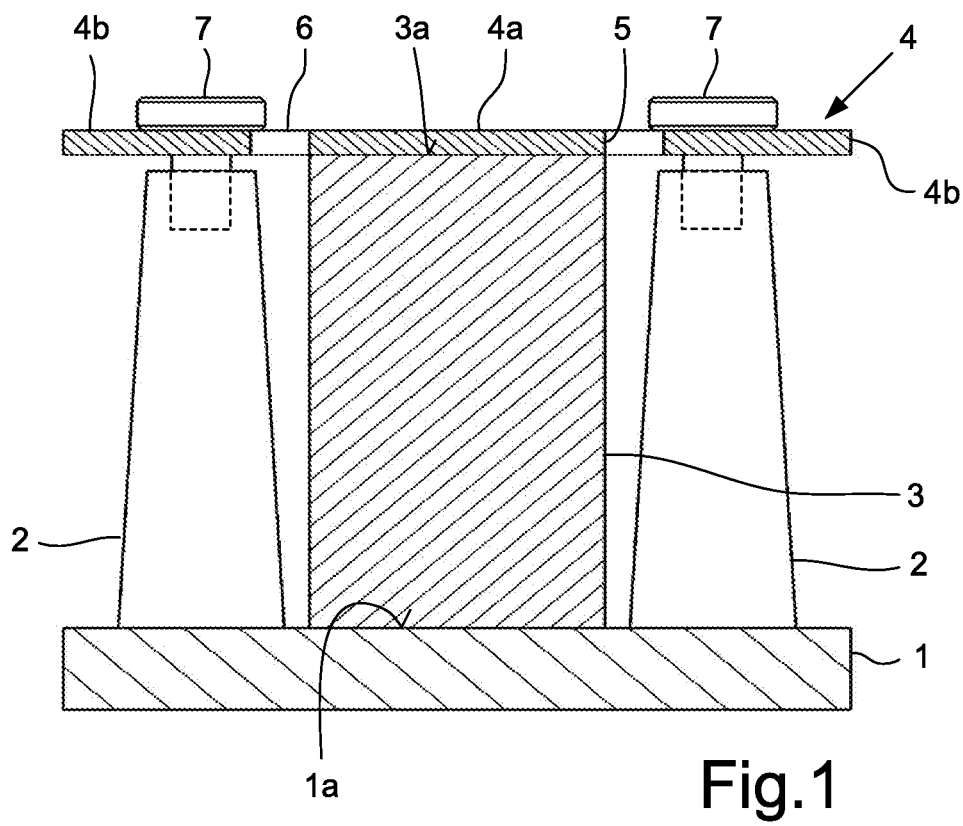
FIG. 1 shows a lateral sectional view of a securing arrangement according to the disclosure in one embodiment before the bracing of a securing element against a component on an appliance.

With reference to the specific embodiment of the figures, wherein like numerals generally indicate like parts throughout the several views, a securing arrangement for at least one component to an appliance is provided. The securing arrangement comprises a securing element which is deformable in regions and is designed for the substantially play-free and positive-locking and/or non-positive locking connection of the at least one component to the appliance. According to the disclosure, it is provided in this securing arrangement that the securing element comprises, consists essentially of, or consists of, a plate, that the securing element has weakened regions and deformation zones between at least one peripheral, unweakened receiving region and at least one pressure and centering region resting on a surface of the component, that the at least one component is arranged on a receiving region of the appliance, that a plurality of spacers extend from the receiving region of the appliance to below the height of the surface of the at least one component, and that the at least one unweakened receiving region of the securing element designed as a plate can be braced against the spacers by utilizing screws such that the deformation zones are deformed and the pressure and centering region resting on the surface of the at least one component fixes the component to the appliance in a positive-locking and/or non-positive locking manner.

The securing arrangement therefore comprises, consists essentially of, or consists of few parts, namely of the spacers between the appliance and the securing element, and screws for bracing and deforming the securing element on a surface of the component and against the appliance. By employing the deformation during the bracing of the securing element, the deformation being adapted to the surface of the component, the both non-positive locking and positive-locking securing of the component to the appliance is produced.

In order to achieve the non-positive locking and positive-locking securing of the component to the appliance, it is, in certain embodiments, provided that the abovementioned weakened regions of the securing element designed as a plate are designed as elongate apertures which are arranged around the pressure and centering region(s), and that these weakened regions are spaced apart from one another by a plurality of deformation zones which are designed as webs and are arranged between the pressure and centering regions and an outer, unweakened receiving region designed as a clamping frame. Instead of elongate apertures in the plate, round apertures, for example bores, can also be provided, between which the webs mentioned are arranged.

The securing element designed as a plate can comprise, consist essentially of, or consist, for example, of a sheet metal plate in which weakened regions in the form of apertures are introduced by punching.

According to another embodiment, it can be provided that the weakened region of the securing element designed as a plate is designed as a peripheral groove arranged between the pressure and centering regions and the clamping frame, wherein the groove base of the groove forms the deformation zone and has a smaller thickness than the pressure and centering region and the clamping frame. In various embodiments, the term groove base does not mean here the surface of the lowest point of the groove, but rather the rest of the material region, which has remained below the groove, of the securing element designed as a plate.

The securing element designed as a plate can comprise, consist essentially of, or consist of, a sheet metal plate or a fiber reinforced plastics plate, into which the groove encircling groove designed as a weakened region be introduced by milling or stamping or by injection molding of the securing element designed as a plastics plate.

The abovementioned structures of the securing arrangement can also be formed in a simple manner for the positive-locking and/or non-positive locking securing of a plurality of components to an appliance. In this case, the securing arrangement has a securing element in the form of a plate with a plurality of weakened regions in the form of apertures or in the form of grooves and with a plurality of deformation zones in the form of webs or groove bases. The weakened regions and deformation zones are arranged between a plurality of pressure and centering regions and a clamping frame engaging around each of the plurality of pressure and centering regions and the weakened regions and deformation zones thereof. The pressure and centering regions can be braced here against a plurality of spacers by utilizing screws.

The object mentioned above is furthermore achieved by a transmission actuator for an automated manual transmission, which has a securing arrangement of the type defined above.

Furthermore, the object defined above is also achieved by the use of a securing arrangement of the type defined above for securing a transmission actuator to an automated manual transmission for commercial vehicles.

FIG. 1 accordingly shows a securing arrangement for a component 3 which is to be secured to an appliance 1 and can be, for example, a solenoid control valve on a transmission actuator in an automated manual transmission for commercial vehicles. The section plane A-A selected for FIG. 1 can be seen in FIG. 3. The component 3 which is to be secured to a flat region 1a of the appliance 1 is arranged between four uniformly spaced, pillar-like spacers 2, the height of which is slightly smaller than the height of the component 3 to be secured.

In the exemplary embodiment according to FIGS. 1 to 4, the securing element 4, 4' is designed as a sheet metal plate into which apertures 5, 5' which run around the component 3 to be secured and form a weakened region of the securing element 4, 4' designed as a sheet metal plate are punched or are introduced in another suitable manner. The apertures 5, 5' have a limited length and are connected by deformation zones designed as webs 6, 6' to a pressure and centering region 4a, 4a' resting on a surface 3a of the component 3 to be secured and to a clamping frame 4b, 4b' engaging around the pressure and centering region 4a, 4a'. The clamping frame 4b, 4b' forms an outer, unweakened receiving region.

Figure 2:
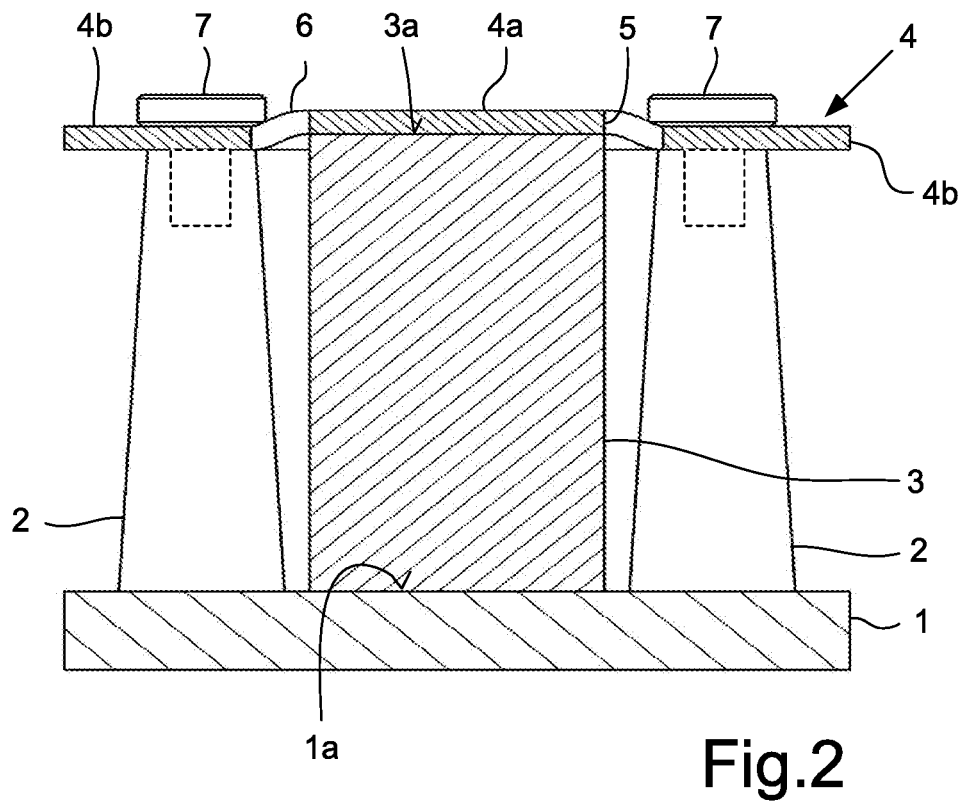
FIG. 2 shows the lateral sectional view of the securing arrangement according to FIG. 1 after the bracing of the securing element against the component on an appliance.

As FIG. 1 shows, the securing element 4 designed as a sheet metal plate is initially flat before the bracing operation and rests only with its pressure and centering region 4a on the surface 3a of the component 3 to be secured, and therefore the outer, unweakened receiving region, which is designed as a clamping frame 4b, of the securing element 4 designed as a sheet metal plate is at a defined distance from the upper end of the spacers 2. If the screws 7, as illustrated in FIG. 2, are tightened, the outer, unweakened receiving region designed as a clamping frame 4b is pressed against the upper end of the spacers 2 by the screws 7 such that the deformation zone formed from the webs 6 is deformed. As a result, the pressure and centering region 4a is pressed with a force, which is also dependent on the geometry of the web 6, against the surface 3a of the component 3 to be secured.

It is apparent from FIG. 2 that, by employing the deformation of the deformation zone 6, which is formed from the webs 6, in addition to the non-positive locking connection via the pressure and centering region 4a, a positive-locking fixing of the component 3 to be secured is produced such that a positive-locking and non-positive-locking connection of the component 3 to be secured to the appliance 1 results without the component 3 to be secured being mechanically overstressed.

Figure 3:
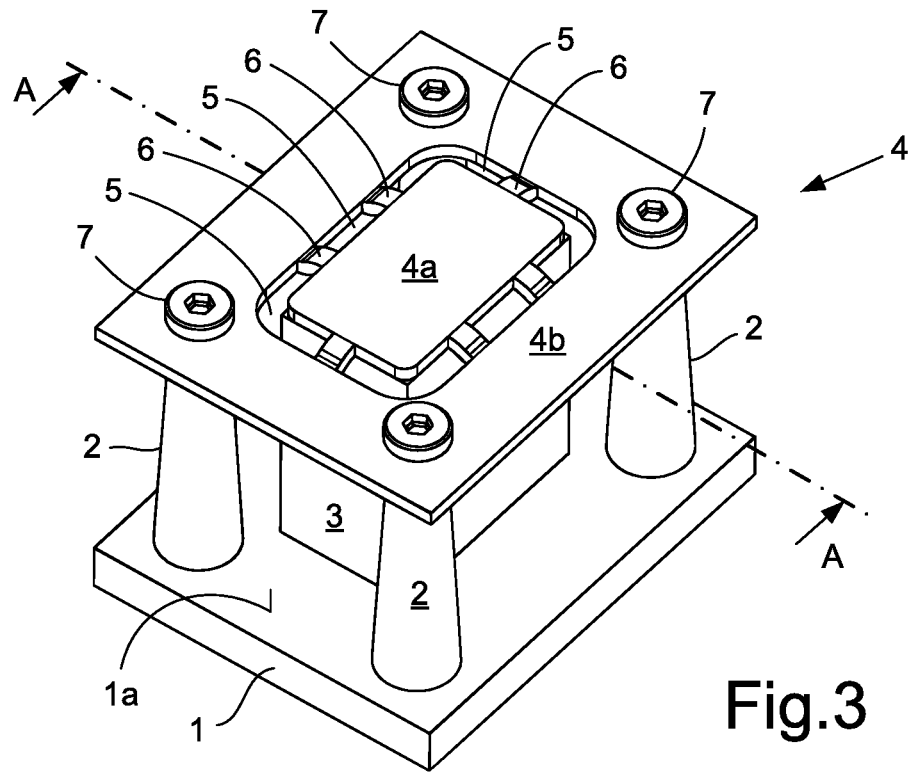
FIG. 3 shows a perspective illustration of the embodiment according to FIGS. 1 and 2 after the bracing of the securing element against a component.
Figure 4:
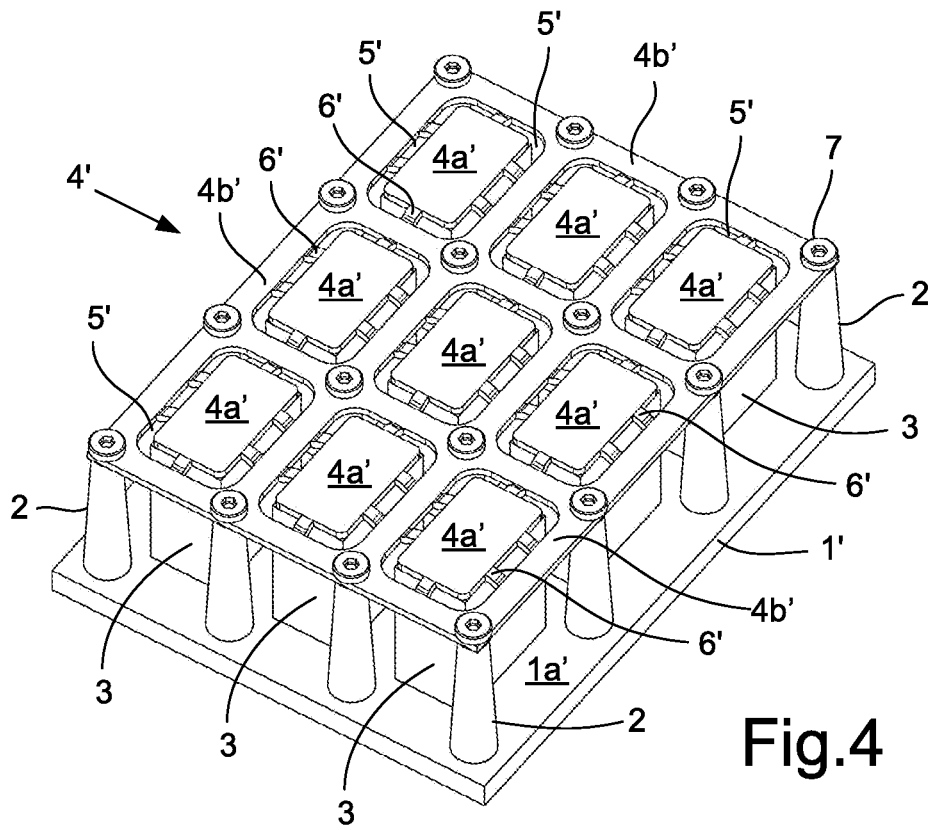
FIG. 4 shows a perspective illustration of another embodiment of a securing arrangement for securing nine components to an appliance.

The securing arrangement according to FIG. 4 is constructed analogously to the securing arrangement according to FIG. 3 and comprises an appliance 1' with sixteen uniformly spaced-apart, pillar-like spacers 2 for nine components 3 to be secured. For this purpose, a securing element 4' is provided which has nine pressure and centering regions 4a' arranged in a uniformly distributed manner. The pressure and centering regions 4a' are connected via a plurality of webs forming deformation zones 6' to a clamping frame 4b' leaving free apertures forming weakened regions 5'. When bracing the clamping frame 4b' for a plurality of components 3 to be secured, by tightening of the screws 7 in the spacers 2 the clamping frame 4b' is braced against the components 3 and results in the deformation, which is apparent both from FIG. 4 and from FIG. 2, of the pressure and centering regions 4a' in relation to the clamping frame 4b' for the components 3 to be secured, with the advantages already mentioned.

Figure 5:
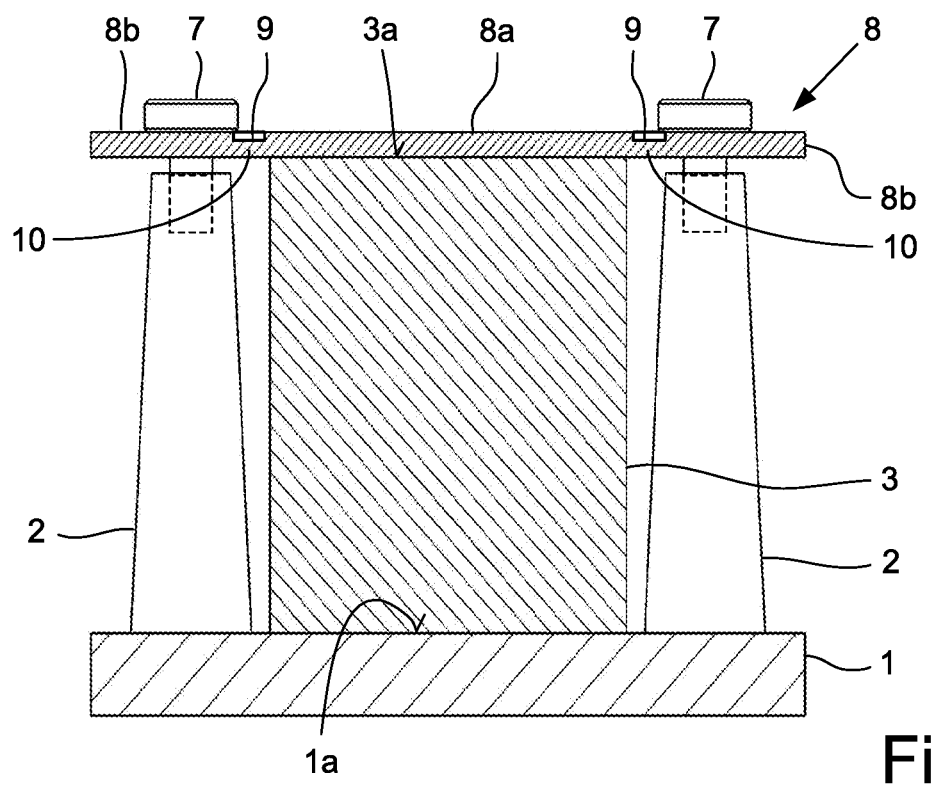
FIG. 5 shows a lateral view of a securing arrangement according to the disclosure in another embodiment before the bracing of the securing element against the component on the appliance.
Figure 6:
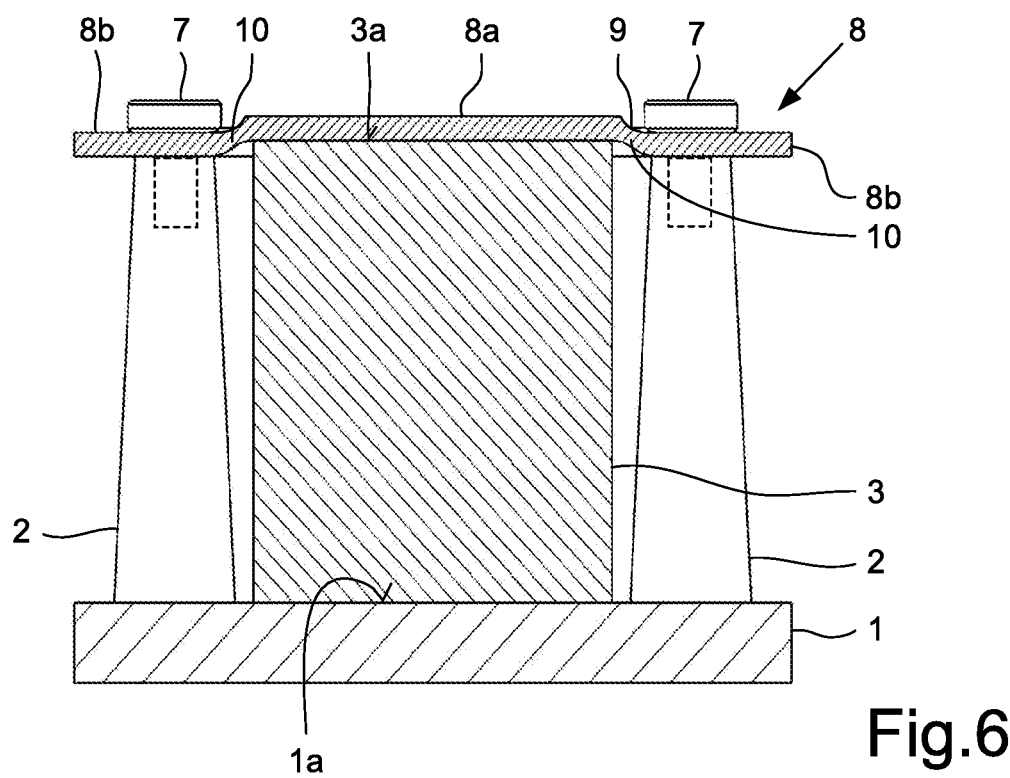
FIG. 6 shows a lateral sectional view of the securing arrangement according to FIG. 5 after the bracing and deformation of the securing element against the component on the appliance.

Instead of the punched apertures 5, 5' shown in FIGS. 1 to 4, according to the exemplary embodiment illustrated in FIGS. 5 and 6, the weakened region on a plate-like securing element 8 can comprise, consist essentially of, or consist of, a peripheral groove 9 which is formed, for example, in the component-remote upper side of said securing element. The groove 9 engages around the upper contact surface or surface 3a of the component 3 to be secured and thereby limits the pressure and centering region 8a of the securing element 8. As FIG. 5 shows, the material residue of the fastening element 8 that has remained below the groove 9 forms a thin groove base 10 which constitutes a deformation zone. The groove base 10 has a suitable smaller thickness than the directly adjacent region, wherein the groove base 10 in this exemplary embodiment is approximately half as thick as the rest of the plate-like securing element 8. The deformation of said deformation zone or of the groove base 10 after the tightening of the screw 7 is illustrated in FIG. 6.

The described plate-like securing elements 4, 4', 8 can be designed as sheet metal plate with apertures 5, 5' punched therein or with grooves 9 milled therein. However, it is also possible to design the securing elements 4, 4', 8 as plastics shaped parts, in which the apertures 5, 5' or the groove 9 are formed by a corresponding design of the injection molds required for the production.

The terms "comprising" or "comprise" are used herein in their broadest sense to mean and encompass the notions of "including," "include," "consist(ing) essentially of," and "consist(ing) of. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-25, ±0-10, ±0-5, or ±0-2.5, % of the numerical values. Further, The term "about" applies to both numerical values when associated with a range of values. Moreover, the term "about" may apply to numerical values even when not explicitly stated.

Generally, as used herein a hyphen "-" or dash "-" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

What is claimed is:

1. A securing arrangement for securing at least one component to an appliance, comprising:
   a securing element which is deformable in regions and is configured for substantially play-free and at least one of a positive-locking or a non-positive locking connection of the at least one component to the appliance;
   wherein the securing element comprises a plate;
   wherein the securing element has weakened regions and deformation zones between at least one peripheral, unweakened receiving region and at least one pressure and centering region resting on a surface of the component;
   wherein the at least one component is arranged on a receiving region the appliance;
   wherein a plurality of spacers extend from the receiving region of the appliance to below the height of the surface of the at least one component; and
   wherein the at least one unweakened receiving region of the securing element is configured as a plate and is configured to be braced against the spacers by utilizing screws such that the deformation zones are deformed and the pressure and centering region resting on the surface of the at least one component fixes the component to the appliance in at least one of a positive-locking or a non-positive locking connection.

2. The securing arrangement as claimed in claim 1, wherein the weakened regions of the securing element are configured as elongate apertures which are arranged around the pressure and centering region, and wherein the weakened regions are spaced apart from one another by a plurality of deformation zones which are configured as webs and are arranged between the pressure and centering regions and an outer, unweakened receiving region configured as a clamping frame.

3. The securing arrangement as claimed in claim 2, wherein the securing element comprises a sheet metal plate in which the weakened regions are formed by punching in the form of apertures.

4. The securing arrangement as claimed in claim 1, wherein the weakened region of the securing element is configured as a peripheral groove arranged between the pressure and centering regions and the clamping frame, wherein the groove base of the groove forms the deformation zone and has a smaller thickness than the pressure and centering region and the clamping frame.

5. The securing arrangement as claimed in claim 4, wherein the securing element comprises a sheet metal plate or a fiber reinforced plastics plate, and wherein the peripheral groove configured as the weakened region is introduced by milling or stamping or by injection molding the securing element configured as a plastics plate.

6. The securing arrangement as claimed in claim 1, wherein the securing arrangement is configured for the at least one of positive-locking or non-positive locking securing of a plurality of components to an appliance, the securing arrangement comprising:
    a securing element in the form of a plate with a plurality of weakened regions,
    wherein the weakened regions are in the form of apertures or in the form of grooves and with a plurality of deformation zones, wherein the deformation zones are in the form of webs or groove bases between a plurality of pressure and centering regions; and
    a clamping frame which engages around each of the plurality of pressure and centering regions, the weakened regions, and deformation zones thereof,
    wherein the pressure and centering regions are configured to be clamped against a plurality of spacers by screws.

7. A transmission actuator in an automated transmission for commercial vehicles, comprising a securing arrangement according to claim 1.

8. The securing arrangement as claimed in claim 1 utilized for securing a transmission actuator to an automated manual transmission for commercial vehicles.

9. A securing arrangement for securing at least one component to an appliance, the at least one component is arranged on a receiving region of the appliance, the securing arrangement comprising:
    a securing element configured for locking connection of the at least one component to the appliance, the securing element comprising a plate and having weakened regions and deformation zones between at least one peripheral, unweakened receiving region and at least one pressure and centering region resting on a surface of the component; and
    a plurality of spacers extending from the receiving region of the appliance to below the height of the surface of the at least one component;
    wherein the at least one unweakened receiving region of the securing element is configured to be braced against the spacers.

10. The securing arrangements as claimed in claim 9, wherein the at least one unweakened receiving region of the securing element is configured as a plate and is configured to be braced against the spacers by utilizing screws such that the deformation zones are deformed and the pressure and centering region resting on the surface of the at least one component fixes the component to the appliance in at least one of a positive-locking or a non-positive locking connection.

* * * * *